(12) United States Patent
Reinardt et al.

(10) Patent No.: US 10,017,016 B2
(45) Date of Patent: Jul. 10, 2018

(54) INLET AIR PASSAGE SCREW ASSEMBLY FOR AN AIR MAINTENANCE TIRE

(71) Applicant: The Goodyear Tire & Rubber Company, Akron, OH (US)

(72) Inventors: Ralf Reinardt, Perl-Besch (DE); Jean-Claude Patrice Philippe Griffoin, Mertzig (LU); Jason Mark Middelberg, Napier (NZ); Frank Pierre Severens, Arlon (BE); Yannick Raymond Georges Haegel, Villeneuve d'ascq (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 389 days.

(21) Appl. No.: 14/816,102

(22) Filed: Aug. 3, 2015

(65) Prior Publication Data

US 2017/0036501 A1 Feb. 9, 2017

(51) Int. Cl.
| | | |
|---|---|---|
| *B60C 23/12* | (2006.01) | |
| *B60C 29/02* | (2006.01) | |
| *B60C 23/06* | (2006.01) | |
| *B60C 29/00* | (2006.01) | |
| *B60C 29/04* | (2006.01) | |

(52) U.S. Cl.
CPC ............ *B60C 23/12* (2013.01); *B60C 29/002* (2013.01); *B60C 29/04* (2013.01)

(58) Field of Classification Search
CPC .......... B60C 5/00; B60C 13/00; B60C 19/00; B60C 23/00; B60C 23/10
See application file for complete search history.

(56) References Cited

U.S. PATENT DOCUMENTS

| | | |
|---|---|---|
| 638,628 A | 12/1899 | Everett et al. |
| 1,050,886 A | 1/1913 | Wetherell |
| 1,134,361 A | 4/1915 | Wetherell |
| 3,304,981 A | 2/1967 | Sheppard |
| 4,922,984 A | 5/1990 | Dosjoub et al. |
| 7,225,845 B2 | 6/2007 | Ellmann |

(Continued)

FOREIGN PATENT DOCUMENTS

| | | |
|---|---|---|
| DE | 3433318 | 3/1986 |
| EP | 2565059 A2 | 3/2013 |

(Continued)

OTHER PUBLICATIONS

EPO Search Report received by Applicant dated Dec. 5, 2016.

*Primary Examiner* — Justin R Fischer
(74) *Attorney, Agent, or Firm* — Edward T. Kennedy

(57) ABSTRACT

An air maintenance tire assembly having an elongate air pumping sidewall air passageway includes an inlet air passage screw assembly inserted through a tire sidewall profiled bore to conduct air from outside the tire into a regulator positioned within a tire cavity. The screw assembly includes a screw body having at an outer end a large-diameter filter housing, a smaller-diameter midsection shank portion, and an inner large-diameter valve housing connecting to the regulator within the tire cavity. A valve mechanism seats within the valve housing and moves between an open position conducting air from the screw body into the regulator assembly and a closed position preventing a backflow of air from the regulator assembly.

17 Claims, 13 Drawing Sheets

(56) References Cited

U.S. PATENT DOCUMENTS

| | | |
|---|---|---|
| 8,113,254 B2 | 2/2012 | Benedict |
| 8,381,785 B2 * | 2/2013 | Losey ................. B60C 23/12 |
| | | 152/415 |
| 8,857,484 B2 | 10/2014 | Hinque |
| 8,944,126 B2 | 2/2015 | Frantzen |
| 8,991,456 B2 | 3/2015 | Gobinath |
| 2014/0020805 A1 | 1/2014 | Gobinath et al. |
| 2014/0109405 A1 | 4/2014 | Benedict et al. |
| 2014/0261943 A1 | 9/2014 | Welter et al. |
| 2014/0360643 A1 | 12/2014 | Collette et al. |
| 2015/0041036 A1 | 2/2015 | Lin |
| 2015/0090386 A1 | 4/2015 | Lin et al. |
| 2015/0122387 A1 | 5/2015 | Gobinath |
| 2015/0122388 A1 | 5/2015 | Durr |
| 2015/0122389 A1 | 5/2015 | Durr |
| 2015/0122390 A1 | 5/2015 | Durr |
| 2015/0165842 A1 | 6/2015 | Welter et al. |
| 2015/0165843 A1 | 6/2015 | Welter et al. |

FOREIGN PATENT DOCUMENTS

| | | |
|---|---|---|
| EP | 2810798 A1 | 12/2014 |
| EP | 2883721 A1 | 6/2015 |
| WO | WO2005012009 A1 | 7/2004 |
| WO | 2007134556 | 11/2007 |

\* cited by examiner

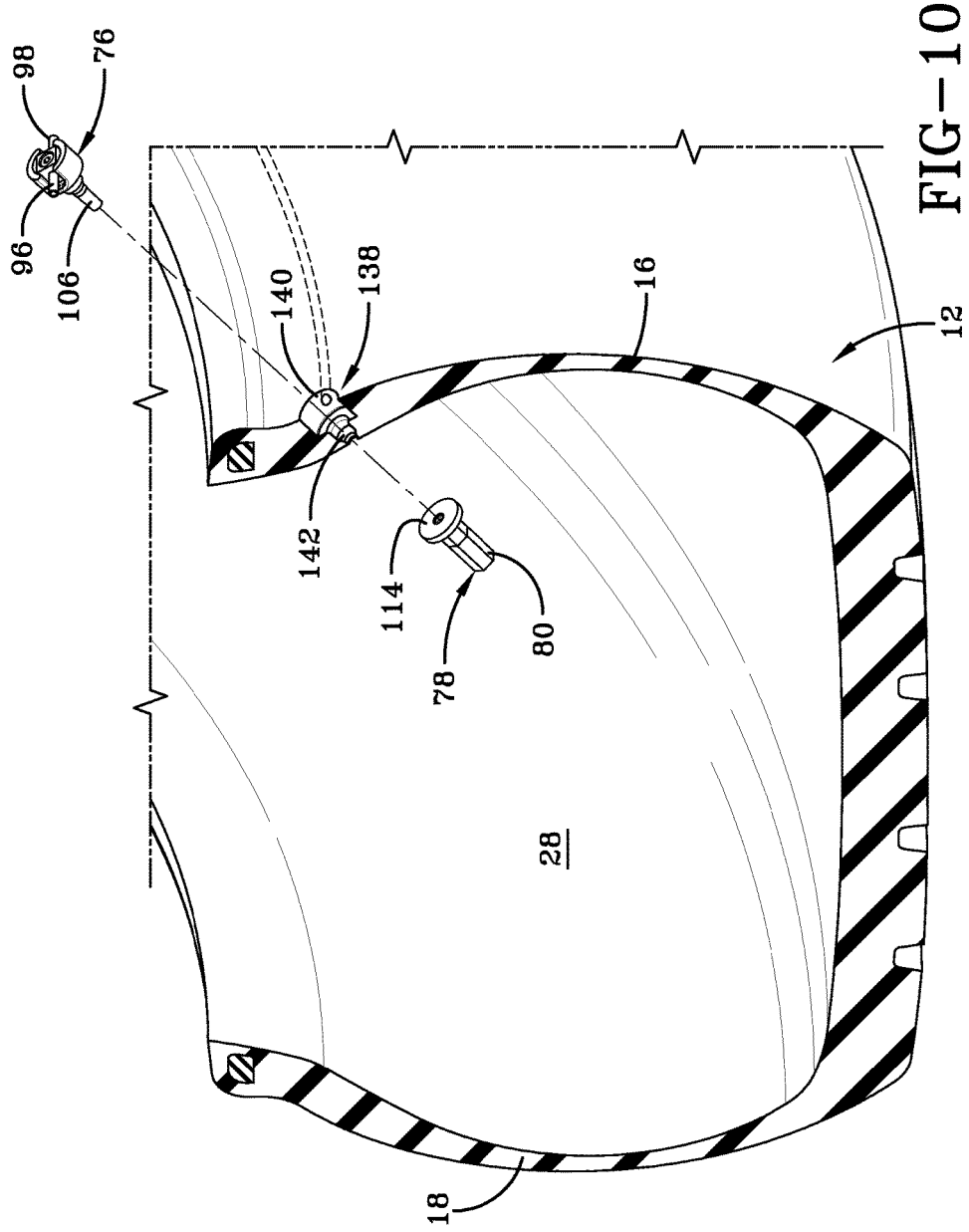

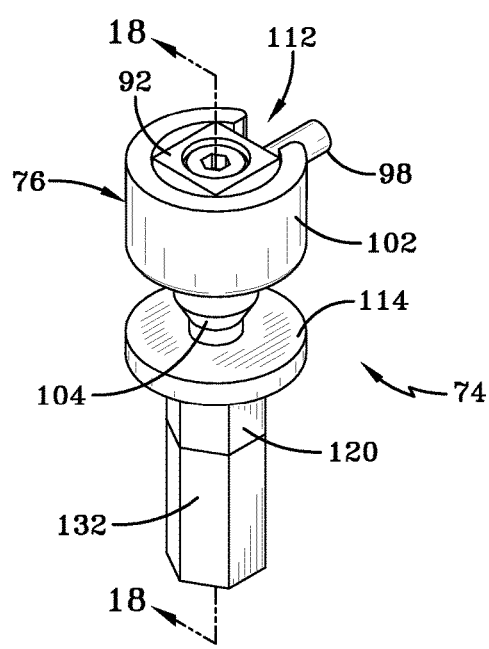
FIG-17
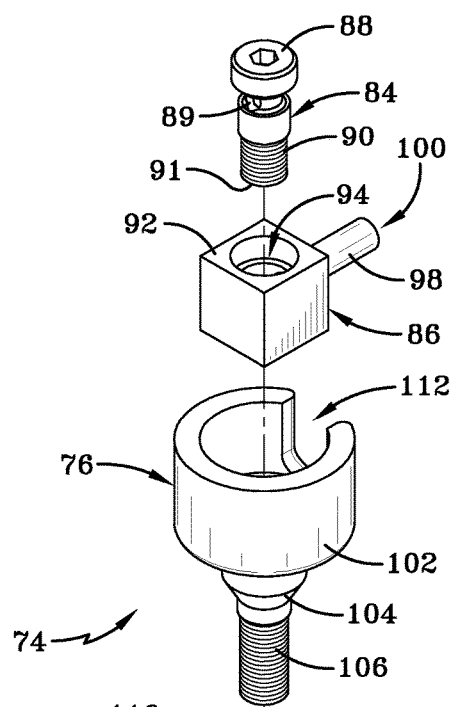
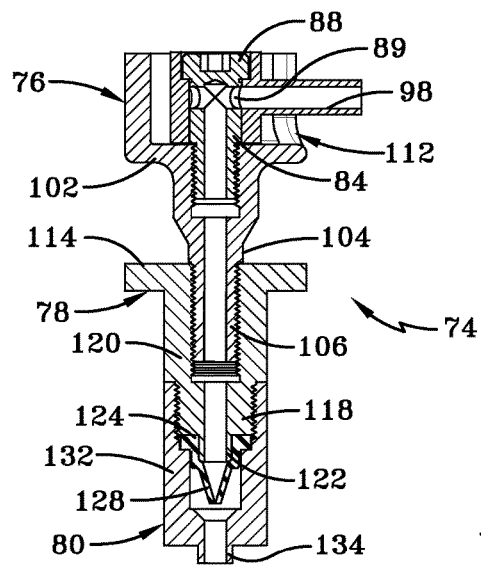
FIG-18
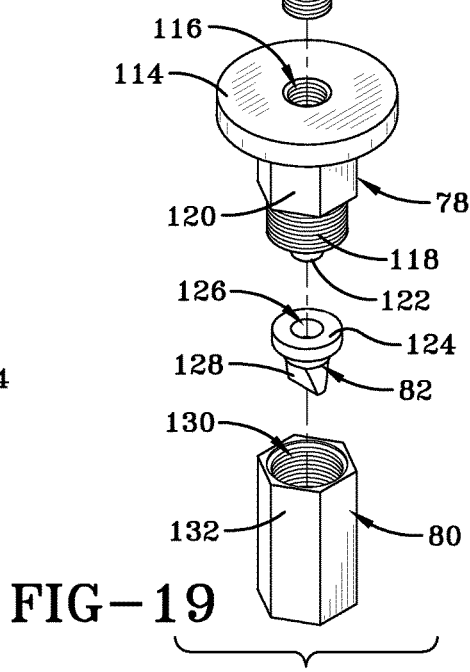
FIG-19

INLET AIR PASSAGE SCREW ASSEMBLY FOR AN AIR MAINTENANCE TIRE

FIELD OF THE INVENTION

The invention relates generally to air maintenance tires and, more specifically, to such tires having an air pumping sidewall passageway and an inlet air passage assembly for conducting outside air into the tire for pressurization by the sidewall passageway.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire pressure monitoring systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance pumping system within a tire that will maintain tire air pressure to compensate for any reduction in tire pressure over time without the need for driver intervention.

Such air maintenance pumping systems require an air inlet assembly for introducing outside air into the pumping mechanism. It is desirable, therefore, to incorporate an air inlet assembly into the air maintenance tire assembly that is secure, reliable, and readily repaired in the event that repair becomes necessary.

SUMMARY OF THE INVENTION

In one aspect of the invention, an air maintenance tire assembly includes an air pumping passageway located within a tire sidewall to generate compressed air. An inlet air passage screw assembly is inserted into a sidewall bore and through the tire sidewall to the tire cavity and conducts air from outside the tire to a regulator positioned within the tire cavity. A screw assembly body has at an outer end a large diameter filter housing, a smaller diameter midsection shank portion and a large diameter valve housing at an inner end of the screw assembly body. The screw body valve housing resides within the tire cavity and connects into the regulator within the tire cavity. A valve mechanism seats within the valve housing and moves between an open position conducting air from the screw body into the regulator assembly and a closed position preventing a backflow of air from the regulator assembly. The large diameter filter housing and the large diameter valve housing prevent dislodging in either radial direction of the screw assembly from the tire sidewall bore during air maintenance assembly operation.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 10 is a partially sectioned perspective view showing the bi-directional outlet screw assembly exploded.

FIG. 17 is a perspective view of the mono-directional outlet screw assembly.

FIG. 18 is a section view of the mono-directional outlet taken from FIG. 17.

FIG. 19 is an exploded perspective view of the mono-directional outlet screw assembly.

DETAILED DESCRIPTION OF THE INVENTION

Figure 1:
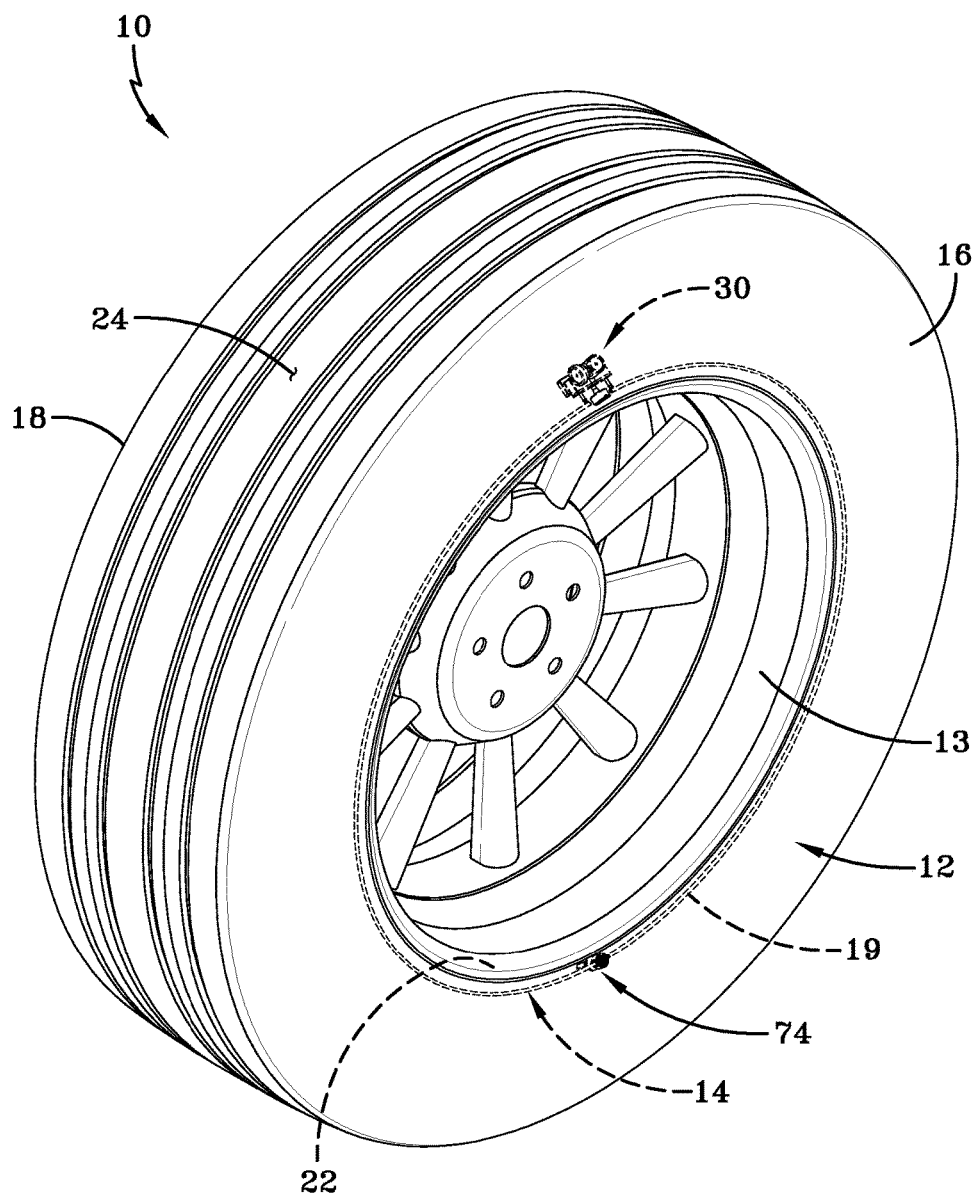
FIG. 1 is a perspective view of a tire with pump channels using the inlet air passageway screw assembly with regulator and bi-directional outlet screw assembly.

Referring to FIGS. 1 through 5, a tire assembly 10 includes a tire 12, and a tire-based peristaltic pump assembly 14. The tire 12 mounts in conventional fashion to a rim 13 for vehicle use. The tire is of conventional construction, having a pair of sidewalls 16, 18 extending from opposite bead areas 20, 22 to a crown or tire read region 24. The tire and rim enclose a tire cavity 28 that is defined by a tire inner liner 26.

As seen from FIGS. 1 through 5, the peristaltic pump assembly 14 includes an annular air passageway 19 formed within one of the tire sidewalls 16, 18. Alternatively, a pump assembly 14 may be placed in both sidewalls if desired. The passageway 19 is enclosed by its host sidewall and may extend 360 degrees about the circumference of the sidewall for bi-directional capability or, alternatively, 180 degrees for mono-directional capability. The air passageway is surrounded by resilient sidewall material such that the passageway 19 may be placed segment-by-segment into a flattened condition subject to external force and, upon removal of such force, returns to an original condition generally circular in cross-section. The passageway 19 has a diameter sufficient to operatively push a volume of air sufficient for the purposes described herein. Air "passageway" 19 is also referred to herein as an air "channel". The passageway or channel 19 is enclosed within a tire sidewall and functions to provide an air pumping device for pressurizing internal air flow around the passageway 19 as the tire rotates against a ground surface.

The operational principle of the peristaltic pumping tube in a tire for the purpose of maintaining tire air pressure is described in issued U.S. Pat. No. 8,113,254, hereby incorporated herein by reference in its entirety. As disclosed, a peristaltic pumping tube is incorporate within a tire sidewall. As disclosed by the above patent incorporated by reference herein, a T-shaped inlet device is affixed inline with an annular pumping tube and conducts air from outside of the tire into the pumping tube for pressurization. A T-shaped outlet device, positioned opposite the inlet device, is likewise affixed inline with the pumping tube. The outlet device conducts pressurized air from the pumping tube into the tire cavity to maintain cavity pressure at a desired level. Functionally, the pumping tube is located in a high flex region of the sidewall. So located, the pumping tube compresses segment-by-segment from an expanded diameter to a substantially reduced diameter responsive to a bending strain introduced into the sidewall from a rolling tire footprint. Pressurized air is thereby forced segment-by-segment along the air tube and directed as needed into the tire cavity for pressure maintenance.

The subject invention pump works pursuant to the same principle as the patent but uses an integral air passageway formed within and by the tire sidewall instead of a separate tube placed inside a sidewall groove.

While working well, the inlet and outlet devices taught by U.S. Pat. No. 8,113,254 are relatively large and their incorporation into and occupancy within a tire sidewall introduces structural disruption in the sidewall. Moreover, the inlet and outlet devices are difficult to access and repair should that become necessary. Finally, the inlet and outlet devices of the patent are not easily affixed to the air tube and replacing such devices within a tire sidewall could prove problematic.

The peristaltic pump assembly 14 of the subject invention provides an inlet air passageway screw assembly and an outlet air passageway assembly. Such assemblies are alternatively referred to herein as "inlet screw assembly" and "outlet screw assembly" from a preferred assembly of such assemblies through a tire sidewall bore by twisting or screwing. Air from outside the tire is routed by the inlet air passageway assembly 36 to a regulator 30 mounted to the tire inner liner 26. The regulator 30 is of a type commercially available and includes a pressure monitoring sensor that measures air pressure within the tire cavity 28. The regulator 30 opens when air pressure within the cavity 28 falls below a threshold level and allows air from the inlet assembly 36 to pass through regulator outlet conduits 32, 34 to the air passageway 19 If air pressure within the cavity 28 is at or above the threshold, air to the pumping passageway 19 is blocked. A suitable representative regulator manufacturer is Eaton Corporation and a suitable regulator configuration is as shown and described in PCT Patent Application Ser. No. US2015/010441, filed Jan. 15, 2015 and entitled SELF-INFLATING TIRE AIR REGULATOR, hereby incorporated herein in its entirety.

Figure 2:
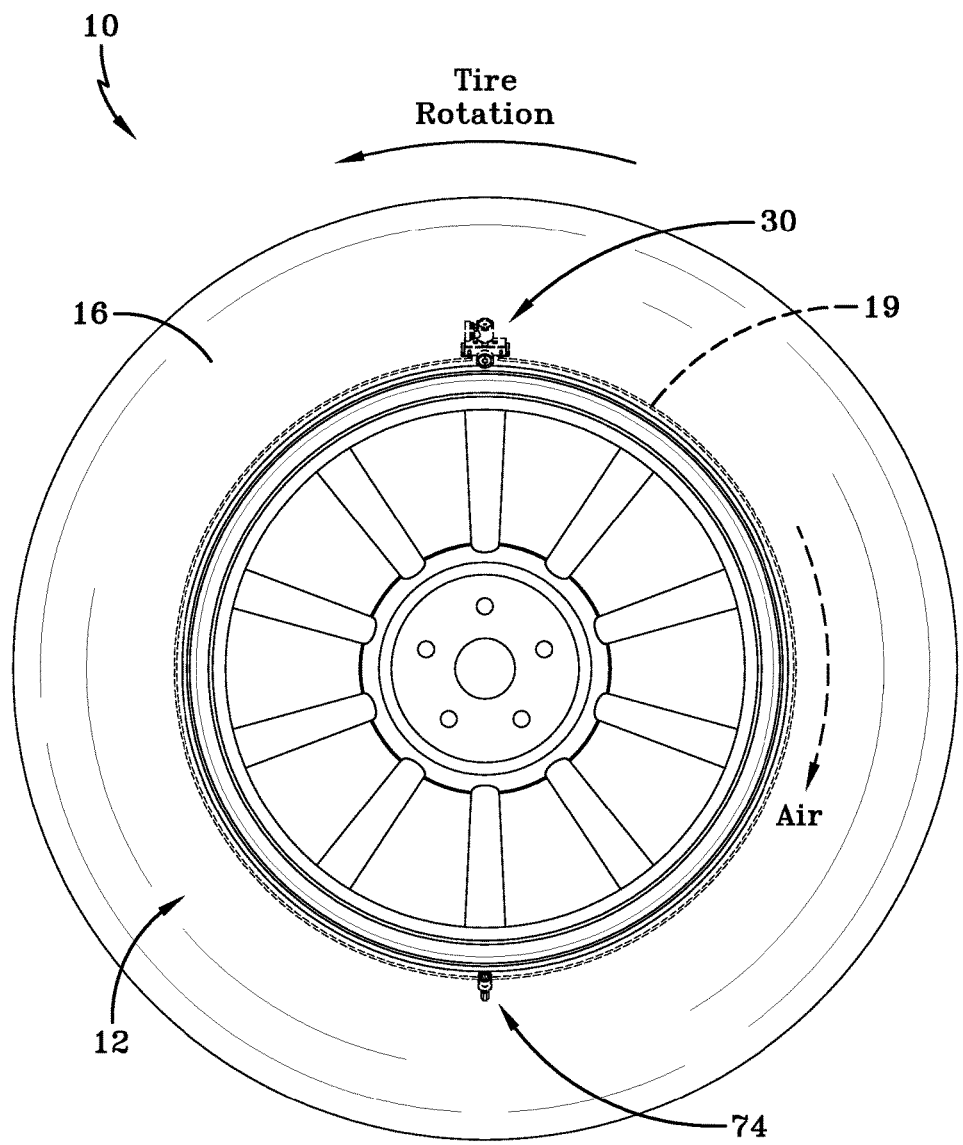
FIG. 2 is a side view of the tire with pump channels using the inlet air passage screw assembly with regulator and outlet screw assembly. Tire rotation is counter-clockwise and air flow is clockwise.
Figure 3:
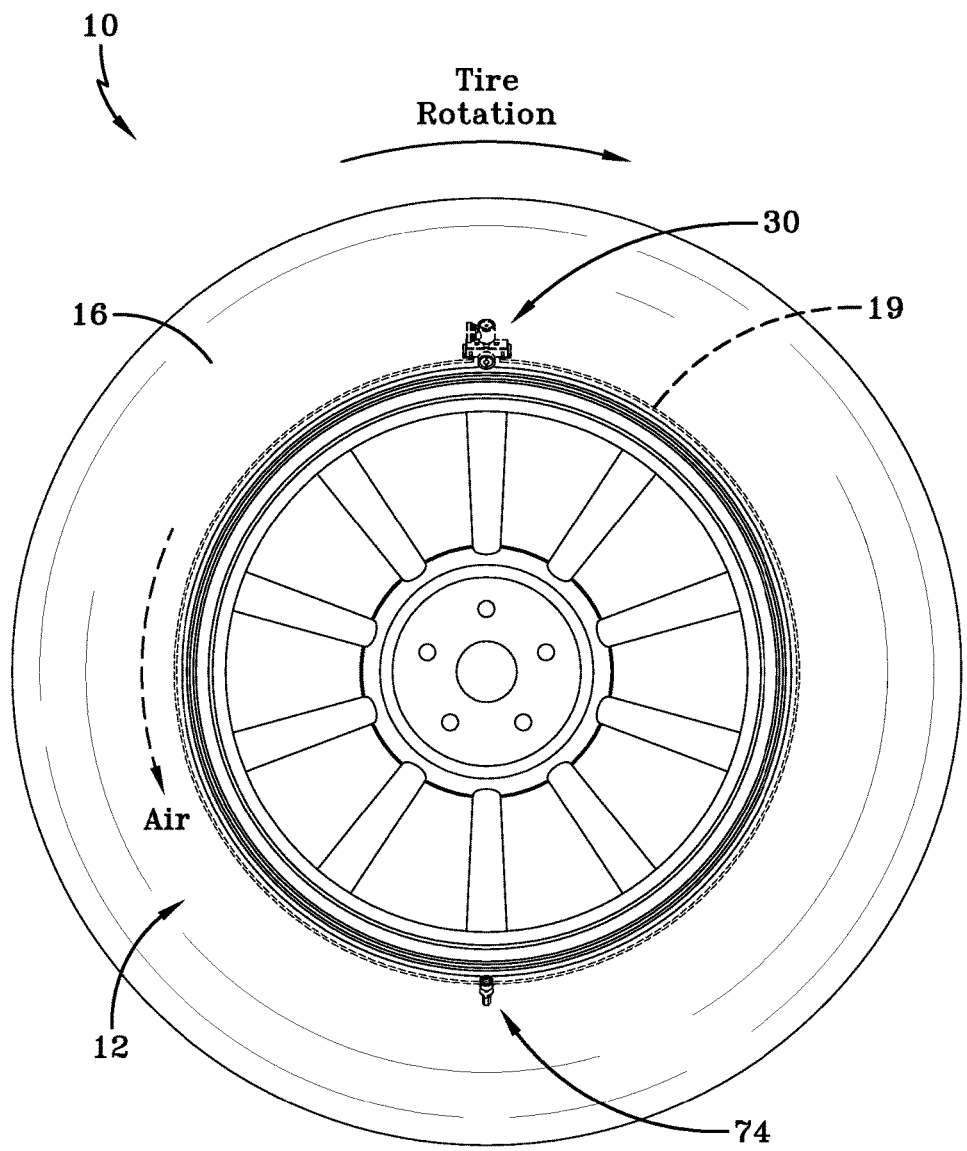
FIG. 3 is a side view of the a tire with pump channels using the inlet air passageway screw assembly with regulator and bi-directional outlet screw assembly. Tire rotation is clockwise and air flow is counter-clockwise, showing the bi-directionality of the air maintenance system.

An outlet screw assembly 74 mounts to the tire at a location opposite the inlet air passageway assembly 36 as seen in FIGS. 1 through 3. The outlet screw assembly 74 directs pressurized air from the air passageway 19 into the tire cavity 28. Air is forced segment-by-segment along the air passageway 19 from pressure on the air passageway is exerted from rotation of the tire against a road surface. In FIG. 2, it is shown that a counter-clockwise rotation of the tire against a road surface forces air in a clockwise direction along the air passageway 19. Air along the passageway 19 is thus pressurized and forced through the outlet assembly 74 and into the tire cavity. In FIG. 3, bi-directionality of the 360 degree air passageway is demonstrated as the tire rotates in a clockwise direction, forcing air along the passageway in a counter-clockwise direction.

Referring to FIGS. 4 through 8, the inlet air passageway assembly 36 and its assembly into the tire sidewall 16 is shown in detail. The air passageway assembly 36 is referred to herein as an "air passageway screw assembly" or an "air passageway screw" due to the torque applied to the assembly during its insertion through a tire sidewall. The regulator 30 has a housing mounted against the tire inner liner 26. The regulator 30 provides an internally threaded socket 31 positioned between the conduits 32, 34. The inlet air passageway assembly 36 is shown in detail by FIGS. 6 through 8. A porous or cellular air filter 38 in the form of a cylindrical body is used to clean air drawn into the system from outside the tire. An elongate generally cylindrical, dumbbell-shaped screw body 48 is preferably of a unitary construction. The body 48 may be formed from a suitable rigid material such as plastic resin. The screw body 48 includes a cylindrical, relatively large-diameter, filter housing 44, a relatively small-diameter tubular midsection portion 46 also referred herein as a "shank" portion, and a mid-sized large-diameter cylindrical valve housing 48. The filter housing 44 is bowl-shaped and receives therein the filter 38. Internal threads at 58 of the housing 44 engage external threads 56 of a cap 40. The cap 40 threads into the housing 42 to enclose the filter 38. The cap 40 has an access opening 41 allowing air to pass into the housing 42 from outside the tire. Such inlet air passes through and is cleansed by the filter 38.

Figure 7:
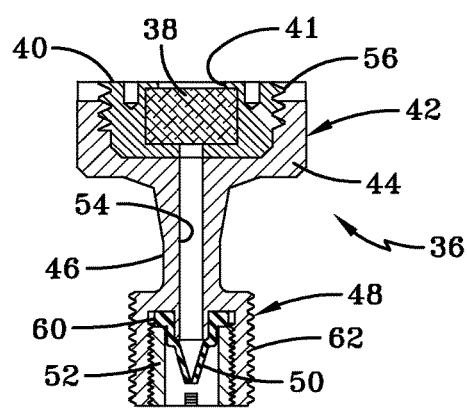
FIG. 7 is a section view of the inlet taken from FIG. 6.
Figure 8:
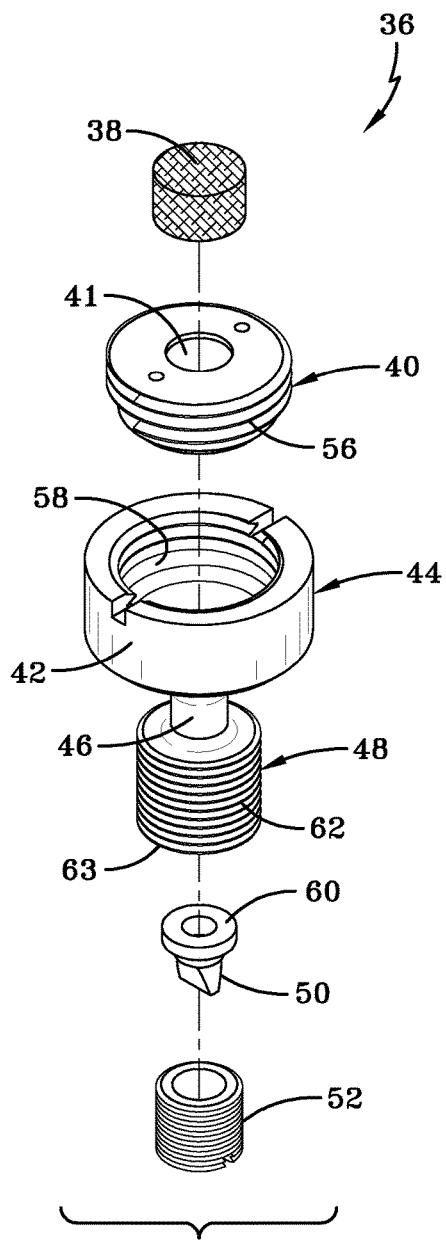
FIG. 8 is an exploded perspective view of the inlet assembly.

The screw body 48 forms an axial air pathway 54 through the body as shown. A check valve 50 is provided in the preferred form of a duck bill valve but other valve configurations may be used if desired. The valve 50 has a peripheral annular retaining flange 60 and is sized for receipt into a valve socket 63 positioned at a lower end of valve housing 48. The flange 60 of the valve 50 seats in a supported fashion within the housing socket as shown in FIG. 7. The retainer ring 52 is cylindrical and externally threaded to engage internal screw threads within the valve housing socket 63. Once inserted, the retainer ring 52 abuts against the valve flange 60 to retain the valve 50 in a seated position within the socket 63 of the housing 48.

Figure 4:
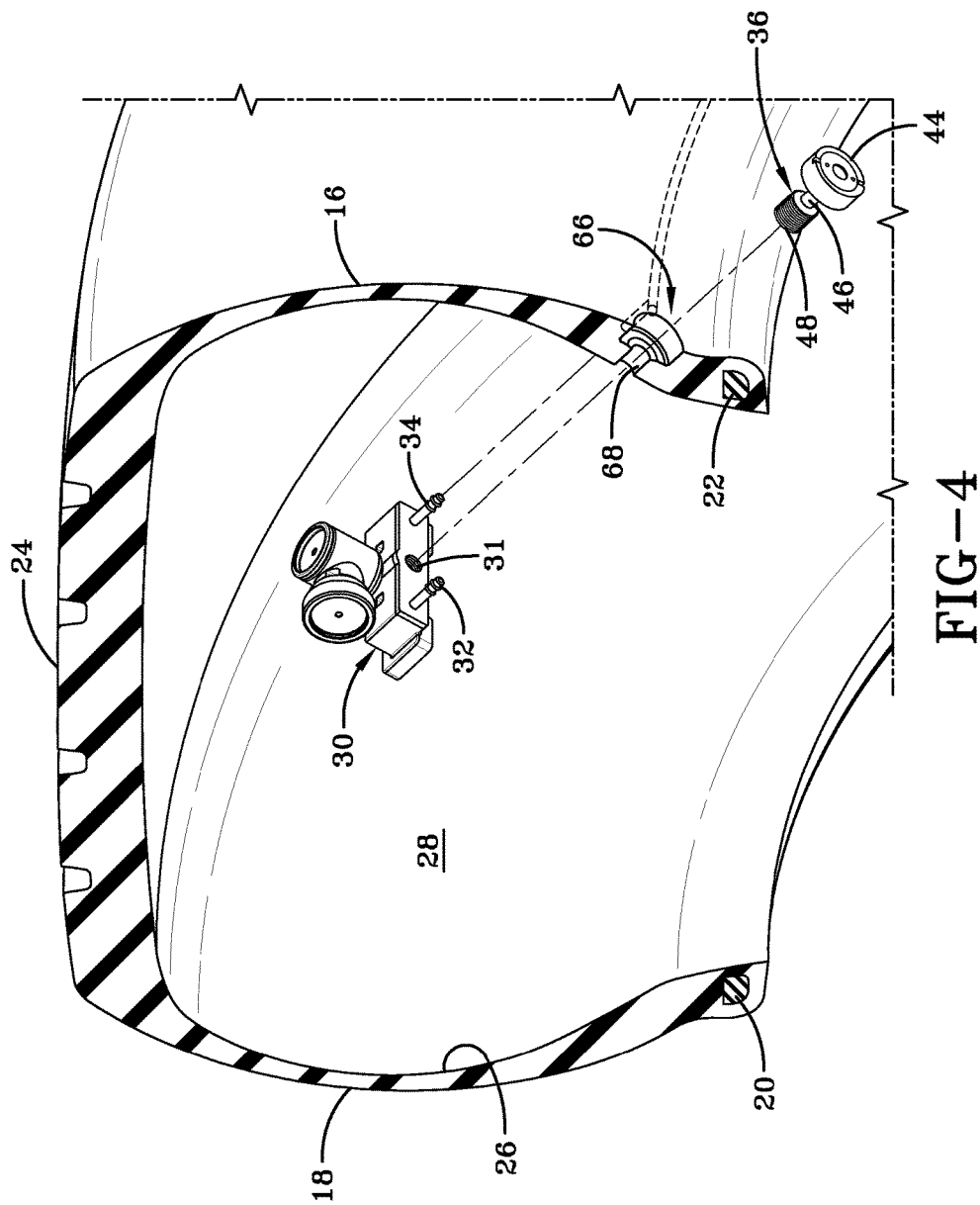
FIG. 4 is a partially sectioned perspective view showing the air passage inlet screw assembly with a regulator exploded.
Figure 5:
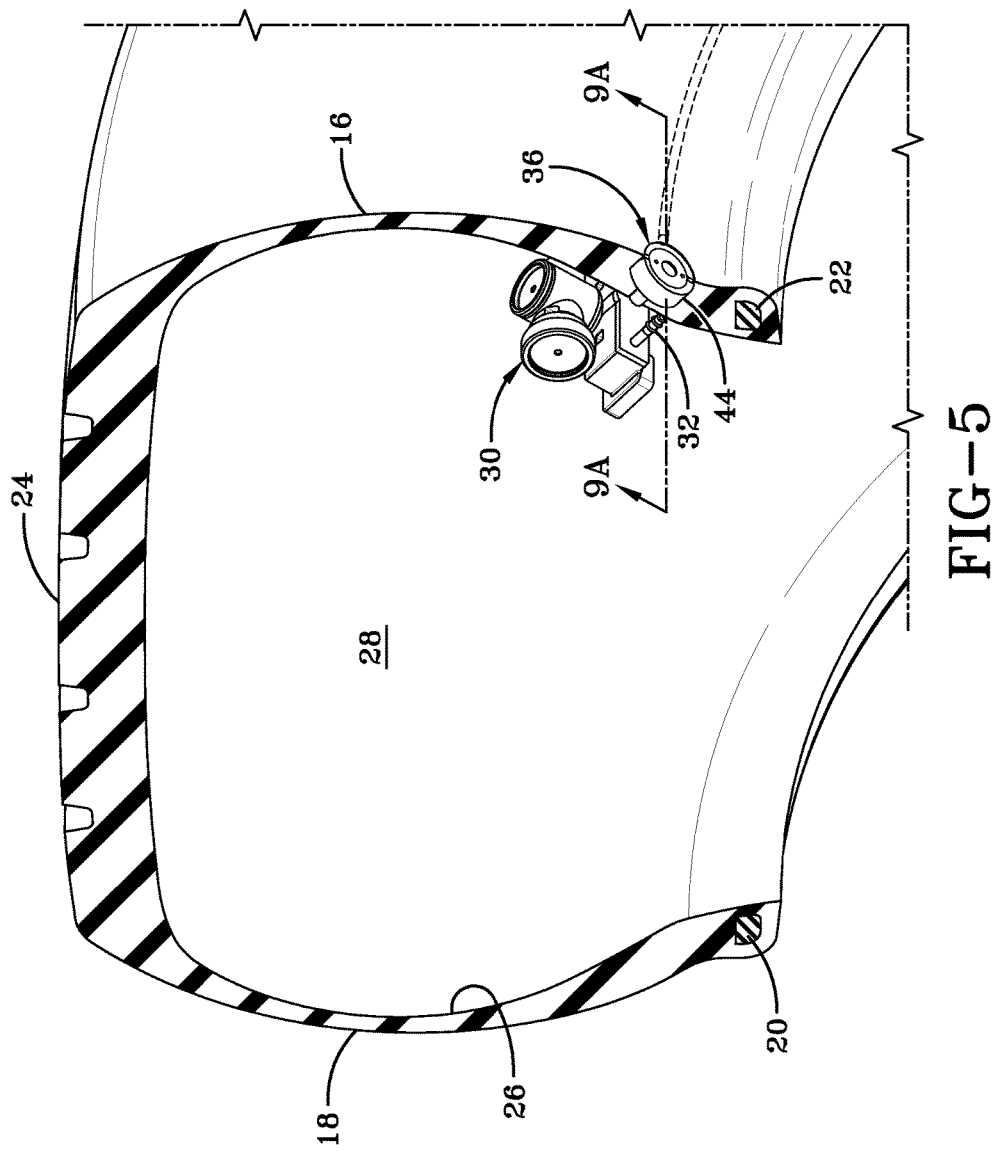
FIG. 5 is a partially sectioned perspective view showing the air passage inlet screw assembly with a regulator exploded.
Figure 6:
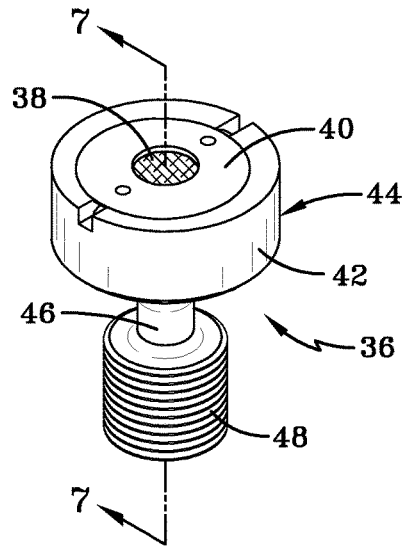
FIG. 6 is a perspective view of the air passage inlet screw assembly.

The assembled inlet air passageway assembly 36 is shown FIGS. 4, 6 and 7. The assembly 36 inserts and attaches to the tire sidewall 16 by means of screw insertion of the assembly 36 through a profiled bore 64 extending through the sidewall as shown. The profiled bore 64 includes a larger diameter filter housing-receiving bore portion 66 and a tubular inner bore shank segment 68 sized nominally larger in section than the screw body shank 46 of the inlet air passageway assembly 36. The inner bore segment 68 is diametrically sized larger than the screw body shank 46 to allow the valve housing at the terminal inward end of the screw body shank to be screwed through the bore during assembly of the assembly 36 through the sidewall. The assembly 36 is inserted into the bore 64 in a post-cure procedure. Once assembled through the bore 64, the valve housing 48 by means of external screw threads 62 threads into the socket 31 of the regulator 30. The regulator is thus securely coupled to the inlet air passageway assembly 36 and, in particular, the screw body 48. The air pathway 54 extending through the assembly 36 is thus placed in air flow communication with the regulator 30. Air intake from outside of the tire passes through the filter 38, the air pathway 54, and the duck valve 50 to enter into the regulator 30.

Figure 9A:
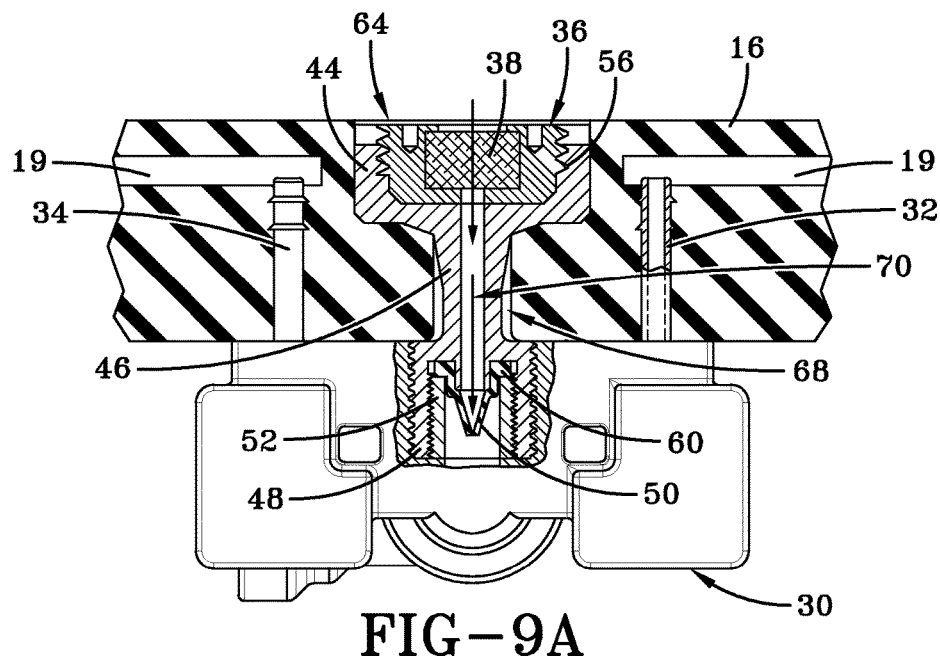
FIG. 9A is a section view taken from FIG. 5 showing air passing through the filter and entering the duck valve.
Figure 9B:
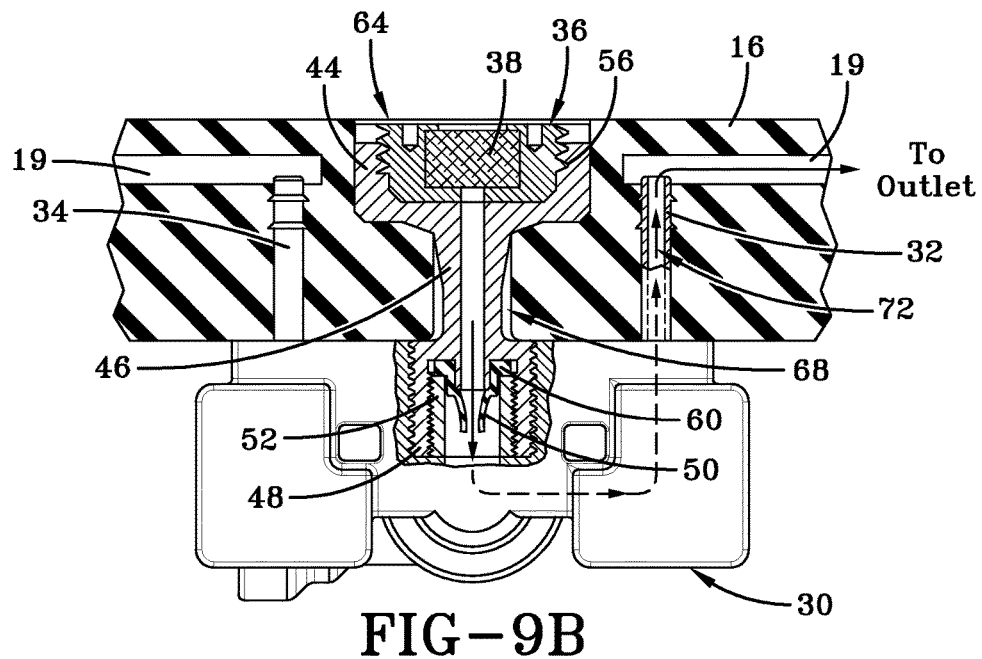
FIG. 9B is a section view showing air passing through the duck valve and entering a pump channel enroute to the outlet.
Figure 11:
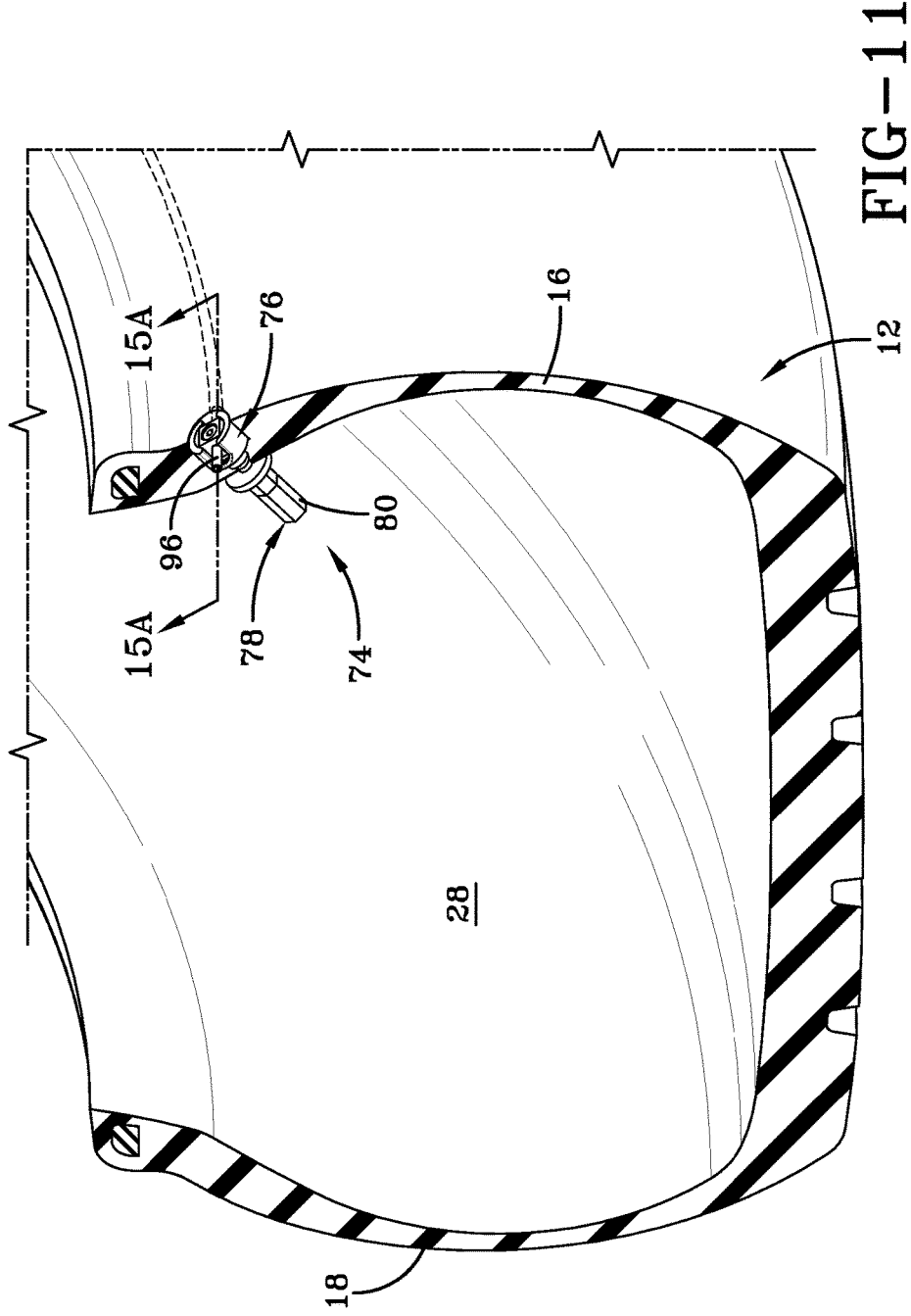
FIG. 11 is a partially sectioned perspective view showing the bi-directional outlet screw assembly installed.
Figure 12:
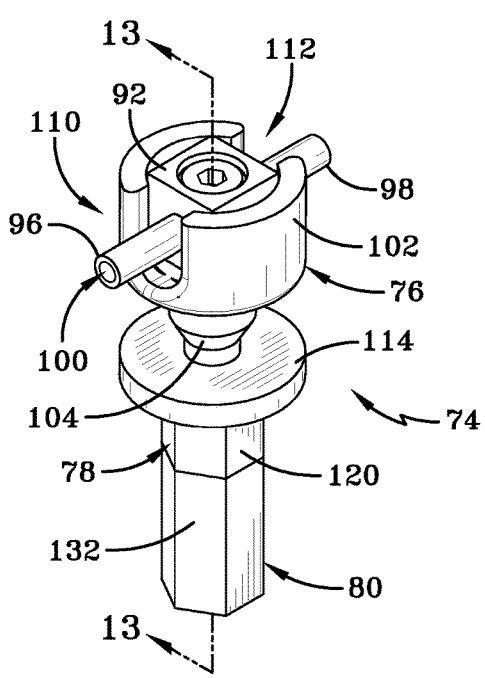
FIG. 12 is a perspective view of the bi-directional outlet screw assembly.

FIG. 9A illustrates by arrows 70 the air flow path in the closed position with duck valve 50 closed or shut. The valve closes by membrane constriction when air is not drawn through the valve from outside the tire. The regulator shuts off air flow into the tire whenever the air pressure within the tire is at or above the desired pressure level. Air intake into and through the regulator from the inlet air passageway assembly 36 is blocked and the duck valve 50 remains in a closed position until air flow through the regulator starts. When air pressure is low in the tire, the regulator opens and allows intake air to pass through the regulator conduits 32, 34. In FIG. 9B, the valve 50 is shown in the open condition, allowing air flow (arrows 72) to pass through the filter 38, along the air pathway 54, through the duck valve 50, and into the regulator 30. The open condition is controlled by the regulator which opens whenever the air pressure within the tire, as sensed by the regulator pressure sensor, falls below a desired level. The regulator 30 allows air to pass into either outlet conduit 32 or outlet conduit 34, depending on the direction of tire rotation. Air from conduit 32 or 34 is introduced into the annular groove within the tire sidewall forming the tire air passageway 19. Rotation of the tire forces the air along the groove 19 toward an outlet assembly and through the outlet assembly into the tire cavity. Air pressure within the tire cavity is thereby raised to the desired level.

It will be seen from FIGS. 4 through 9B that the air passageway assembly 36 is in the form of a screw that is twisted through the sidewall bore during sidewall attachment and then subsequently screws into the regulator 30. The peristaltic pump assembly 14 requires an air passage from the surrounding atmospheric air through the tire sidewall in order to replace the lost air from the tire. The air passageway assembly or screw 36 provides a filter to allow clean air to enter the AMT system, and to the tire. Furthermore, the system incorporates additional functionality in housing an air filter, mounting the regulator to the tire. The check valve 82 incorporated within the air passageway assembly 36 operates as a guard against back flow of air from the AMT system to the atmosphere surrounding the tire. The valve 82 allows air to flow into the tire but prevents back flow of air from the tire.

The screw assembly body 42 is pushed and twisted from outside of the tire through the molded bore (hole) 64. The shape of the bore 64 matches the air passage screw assembly shape. Once through the tire sidewall and in position, the valve 50 and housing 52 are installed into the housing 48, and the screw assembly is then screwed into the regulator 30. Lastly, the filter 38 is enclosed within housing 42 by the cap 40. The dumbbell general shape of the screw assembly prevents its detachment from the tire sidewall bore in either inward or outward directions. The filter housing 44, on the outside acts as an anchor to prevent the weight of the pressure regulator at high speeds to pull the air passageway assembly 36 through the tire sidewall. Likewise, the regulator 30 and its relative large size in relation to the diameter of the sidewall bore 64 prevents the regulator from being pulled or pushed back through the bore 64.

As described above, center of the air passageway screw 36 is hollow forming the air pathway 54. Air is thus allowed to flow from a radially outer end of the screw assembly to a radially inner end, from the filter 38 to the pressure regulator 30. The check valve 50 is mounted to the radially inward end closest to the regulator 30 and operates as a fail-safe to prevent air from escaping back from the tire cavity through the regulator and the air passageway assembly.

While the inlet air passageway assembly 36 is shown attached to the lower region of a tire sidewall, it may alternatively be placed in a chafer, shoulder or tread region. The filter 38 is used to clean air passing through the assembly 36 but may be dispensed with if desired. Also, the check valve 50 may be removed from the assembly if its fail safe function is not needed.

Referring to FIGS. 10 through 14, an air outlet screw assembly 74 is shown for use by the subject AMT system. The outlet screw assembly 74 provides an outlet air passage from the pump groove 19 through or partially through the tire sidewall 16. Compressed air from the pump groove 19 is thereby directed to the tire cavity 28 to bring the cavity air pressure to a desired level. Thus, the assembly 74 acts primarily as a single air passage to allow compressed air from two pump channels in the pump assembly bi-directional configuration or a single pump channel in the mono-directional configuration. The outlet screw assembly 74 furthermore provides a fail-safe valve sub-assembly that may be secured to the tire sidewall.

The outlet screw assembly 74 includes an elongate tubular outlet screw body 76 formed of suitably rigid material such as plastic. The body 76 screw assembles to a valve bottom screw housing 78 which, in turn, screws into a retainer nut 80. A check valve 82 such as a duck valve is housed and seats within the screw housing 79. An assembly screw 84 inserts into a T-block 86 which inserts into an upper housing 102 of the screw body 76. The upper housing 102 is bowl-shaped having a hollow interior. The assembly screw 84 has an externally threaded shaft 90 that inserts through a through bore 94 of the T-block 86 and into an internally threaded socket of the screw body 76. A shank segment of the assembly screw 84 has an air passageway positioned to allow air entry when the assembly screw 84 is in the inserted position within screw body 76 as will be seen in FIG. 13.

The T-block 86 is a hollow cube-shaped body having the through bore 94 extending from a top surface through the block to a bottom surface. Two cylindrical arms 96, 98 extend in opposite directions from the T-block 86, each arm having an axial air passageway 100 extending therethrough. Air passing through passageways 100 enters the T-block internal through bore 94 and passes along the bore 94 to a lower side of the T-block. The T-block is shaped as a cube and fits within a hollow screw body receptacle 102. The body 76 tapers along a mid-segment shank portion 104 to an externally threaded lower cylindrical shaft 106. A center axial air passageway 108 extends down through the screw body 76 from the receptacle 102 at a top or outer end to a lower end of the shaft 106. The receptacle 102 is formed having two U-shaped openings 110, 112 in opposite sidewalls. The openings receive the arms 96, 98 of the T-block upon insertion of the T-block 86 into receptacle 102.

Figure 13:
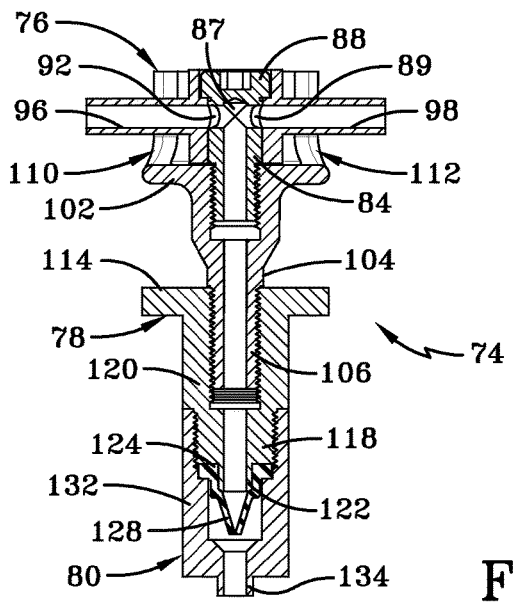
FIG. 13 is a section view of the outlet screw assembly taken from FIG. 12.
Figure 14:
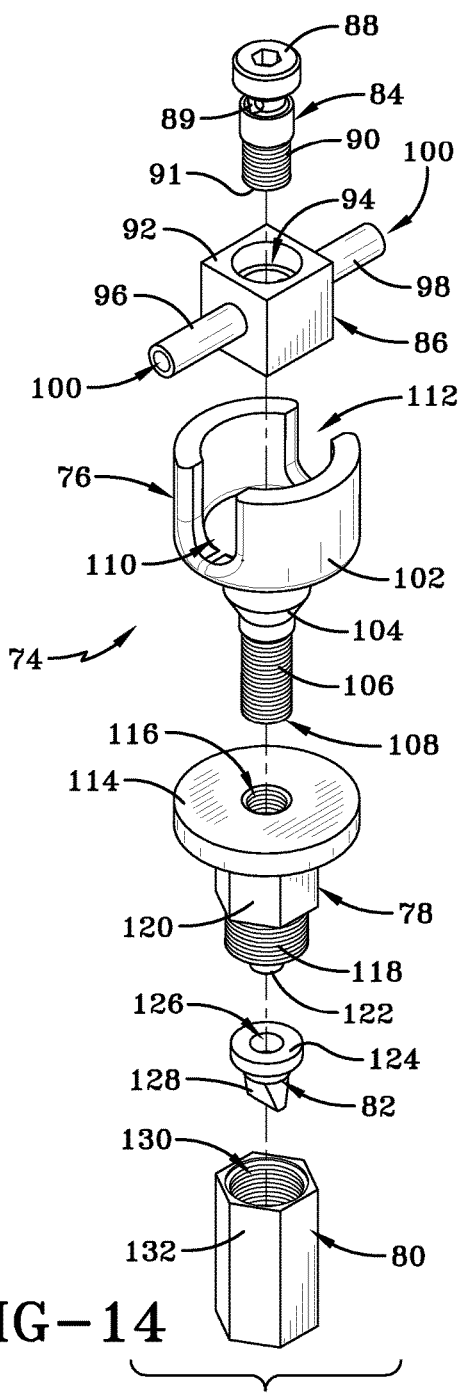
FIG. 14 is an exploded perspective view of the bi-directional outlet screw assembly.

The externally threaded shaft 106 screws into the valve housing 78. The valve housing 78 has a annular outward projection flange 114 and a through air passageway 116. The valve housing 78 has a cylindrical mid-segment 120 hexagonal in external configuration and a lower externally threaded post 118. A centering post 122 projects downward from the lower end of the valve housing 78. The check valve 124 includes an annular upper flange 124 and a center axial air passageway 126 extending end-to-end through the valve body. The valve 82 opens and closes at membrane 128 to allow or prevent the passage of air from the sidewall groove 19 down through the valve 82 and into the tire cavity 28. The valve 82 is seats against a lower end of the bottom screw 78 with the annular valve flange 124 seated against an external end surface of the shank end 118. The valve 82 seats over the post 122. After the valve 182 is in seated position over the post 122, the retainer nut 80 screws over the shank 118 to hold the valve 82 in place. An internal shoulder within the nut axial through bore 130 holds the valve by engagement with the valve annular flange 124 as seen in FIG. 13. The hex configuration of the nut 80 assists in tightening the nut body 132 to the shank 118. A tubular end post protrusion 134 at the bottom of the nut 80 extends and assists to direct air passing from top to bottom through the outlet screw assembly into the tire cavity. The components 74, 76, 78, 80 and 82 have axial passageways that align in the assembled condition to create an air passageway from the arms 96, 98 to the tire cavity 28.

Attachment of the outlet screw assembly 74 through a tire sidewall 16 and operation of the assembly 74 will be understood from FIGS. 10, 11, 15A and 15B. The screw assembly 74 inserts through a profiled bore 138 formed within the sidewall 16. The bore 138 has a radially outward enlarged-diameter region 140 into which the screw body receptacle 102 is seated and a radially inward bore shank 142 receiving the screw body shaft 106. After the screw body 76 is inserted through the bore 138, the valve bottom screw 78 couples to the shaft 106 by threaded engagement. The valve 82 is then placed into seated position over a lower end of the threaded shank 118 and the nut 80 is screwed onto shank 118 to hold the valve in position. The components 78, 80, 82 thus reside within the tire cavity 28 and may be readily replaced in the event repair becomes necessary. The arms 96, 98 extending from the T-block 86 upon insertion of assembly 74 to the bore 138 are placed within opposite ends of the air passageway 19. Air passing from the air passageway 19 of the sidewall 16 is thus directed into the T-block through the passageways 100 of the arms 96, 98. From the T-block 86 the air can pass axially inward through the outlet screw assembly 74.

Figure 15A:
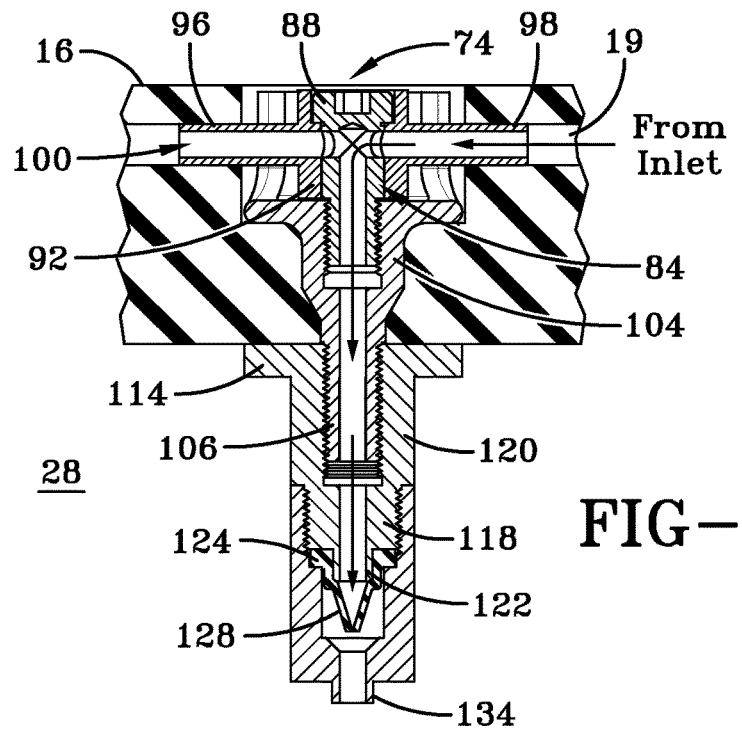
FIG. 15A is a section view taken from FIG. 11 showing air coming from the pump channel, entering the outlet and entering the duck valve.

FIG. 15A illustrates the outlet screw assembly 74 in the closed condition, with valve 128 closed. This condition exists when the air pressure within the tire cavity 19 is at or above a desired level. The regulator (previously described) 30 functions to sense tire pressure within the cavity 19 and to block air flow into the pumping sidewall groove 19 when no further air is required by the tire cavity 19 to maintain desired pressure. In the closed position of FIG. 15A, the closed valve 128 additionally functions to prevent back flow of air from the tire cavity 28 through the outlet assembly 74 and into the sidewall groove 19.

Figure 15B:
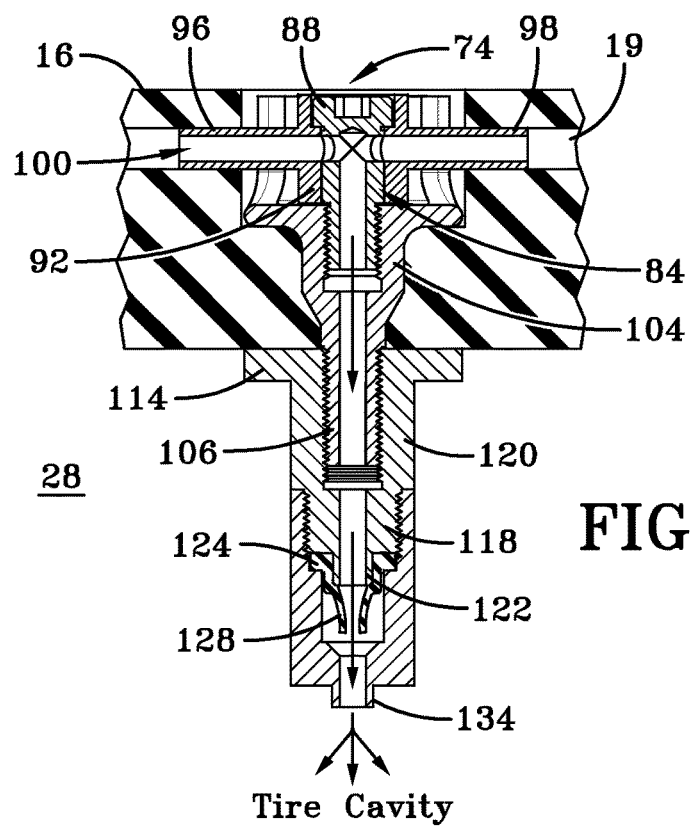
FIG. 15B is a section view showing air passing through the duck valve and entering the tire cavity.
Figure 16:
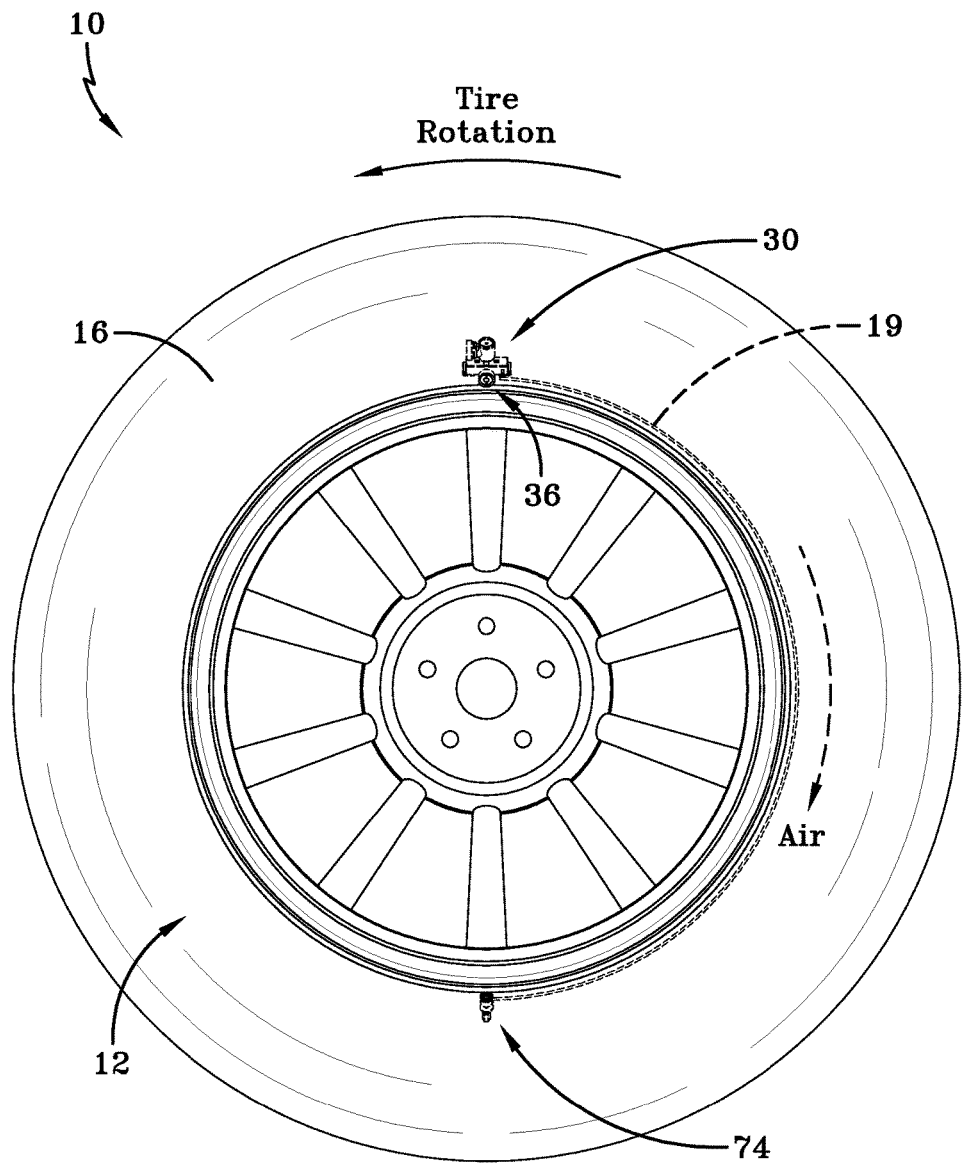
FIG. 16 is a side view of the tire with pump channels using an air passage screw inlet with a regulator and a mono-directional outlet screw. Tire rotation is counter-clockwise and air flow is clockwise.

FIG. 15B represents the outlet screw assembly 74 in the open position, conducting pressurized air from the sidewall groove 19 through the assembly 74 and into the tire cavity 28. The regulator 30, sensing tire pressure within the cavity 19 to be lower than desired, opens to allow air to flow from inlet air passageway assembly 36 into the tire sidewall groove 19. The groove 19 progressively forces the air along the groove 19 as the tire rotates until the air reaches and enters the outlet screw assembly 74. The assembly 74 conducts the air down through aligned axial passageways of the assembly components, through the open valve 128 and into the tire cavity 28. Once air pressure within the cavity is raised to the desired preset level, regulator 30 closes off further air input into the groove 19 and pumping of air by the groove 19 ceases.

It will be appreciated that the 360 degree configuration of the sidewall groove 19 makes the air pumping assembly 14 bi-directional; that is, air is pumped along the groove 19 in both directions, alternatively, depending on whether the tire is rotating forward or backward. In either direction the outlet screw assembly 74 functions to admit air into the tire cavity. The assembly arms 96, 98 are connected to ends of the air pumping groove 19 and thus conduct air flow in a bi-directional manner into the assembly 74 and therefrom into the tire cavity 28. Should mono-directional air pumping be desired, the system may be altered into a mon-directional configuration as shown in FIG. 16 and FIGS. 17 through 19. In the mono-directional system, the groove 19 within the tire sidewall 16 extends in an arcuate path of 180 degrees. The groove 19 extends between the location of the inlet air passageway assembly 36 and the outlet screw assembly 74. Air flows into the system through the assembly 36, as previously described, through regulator 30, and is pumped along the groove 19 as the tire rotates (in a single direction only) and exits the groove 19 through the outlet screw assembly 74. Mono-directional air flow along the groove 19 is thus used in the mono-directional system configuration, to re-inflate the tire cavity to a desired air pressure in the same manner previously described with regard to the bi-directional system.

FIGS. 17, 18, and 19 show the components assembled to form the outlet screw assembly 138 for a mono-directional system. The components are generally the same as previously described in reference to FIGS. 12 through 14 with the exception of modification to block 92 and screw body 76. Like numerals that are previously used in the bi-directional system are applied in the mono-directional system of FIGS. 17 through 19 where appropriate. In FIGS. 17 through 19, it will be seen that the block 92 is constructed to provide a single arm extension for positioning within the sidewall groove 19. Accordingly, the bowl-shaped receptacle 102 receiving the block 92 during assembly only requires a single opening 112 to receive the lone arm 98. Assembly of the outlet screw assembly 76 through a tire sidewall bore proceeds as previously explained.

From the foregoing, it will be seen that the subject outlet screw assembly 74 provides an air outlet passage from the enclosed pump channel 19 at least partially through the tire structure, typically the sidewall 16, to provide compressed air to enter into the tire cavity 28. The air passage screw assembly 74 acts primarily as a single air passage to allow the compressed air from either two pump channels in a bi-directional system or a single pump channel in a mono-directional system entering the tire cavity 28. Furthermore, the outlet screw assembly 74 provides additional functionality in providing a check valve to prevent undesirable backflow of air from the tire cavity and the loss of air pressure such backflow would cause.

The pump outlet screw assembly 74 consists of a single piece body 76 that can be inserted into the tire structure, such as sidewall 16, after tire curing. The body 76 will be pushed form the outside through a molded hole or bore 116 in the tire. The shape of the bore 116 matches the air passageway screw body 76 shape. Once through the tire and in position, the bottom valve screw 78 is fixedly attached and the valve 82, retainer nut 84 are attached. The T-block 86 is then installed.

The center pathway of the outlet screw assembly once fully assembled is hollow to allow air flow from the pumping passageway 19 to the tire cavity 28. The T-block 86 avoids an air flow from one side of the 360 degree air passageway 19 to the other by having incorporated within the assembly screw 84 an internal directional valve 87. See FIG. 13. As shown, air entering the T-block either through arm 96, 98 encounters an internal valve 87 within the T-block. The valve 87 directs air flow down through the outlet screw assembly toward the valve 128 but prevents air from flowing through from the T-block through the opposite arm 96, 98 and back into the pumping passageway 19.

The large diameter of the screw body receptacle 102 on the outside acts as an anchor to prevent the weight of the screw at high speeds to pull in from the tire sidewall. Likewise, valve bottom screw 78 having wide peripheral flange 114 acts to prevent the screw from being pulled or pushed out. The receptacle 102 has an internal thread for receiving the assembly screw shaft 90. The shaft 106 in turn screws into the valve bottom screw socket 116. The bottom screw 78 can thus compensate for variations in tire sidewall thickness gauge. The bottom screw 78 will be fixed with a requisite torque to the screw body 76 to reach a proper sitting and to prevent air leakage. The check valve 82 prevents air from leaking out of the tire as described above. The outside of the screw body 76 allows it to screw into position within the bore 116 during assembly.

The outlet screw assembly 74 may be attached alternatively to a tire chafer, shoulder or tread. It may be used without the check valve 82 if such a function is not deemed necessary.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air maintenance tire assembly comprising:
   a tire having a tire cavity defined by an inner liner, the inner liner bounded by first and second sidewalls extending to a tire tread region;
   the first sidewall having an elongate sidewall air passageway, the air passageway operatively located to compress segment-by-segment from an expanded diameter to a substantially reduced diameter responsive to a bending strain introduced into the first sidewall from a rolling tire footprint to compress air along the sidewall air passageway;

an outlet air passageway assembly connecting to the sidewall air passageway and directing compressed air from the sidewall air passageway into the tire cavity;

a regulator assembly positioned adjacent the tire inner liner operative to control pressurized air flow into the tire cavity;

an inlet air passage screw assembly comprising an elongate screw body extending through an axial span of the first sidewall and the screw body having an elongate internal air pathway operative to conduct air through the screw body;

a valve housing at an inward end of the screw body, the valve housing having a valve socket extending into a remote end of the valve housing in an air flow communication with the screw body internal air pathway, and the valve housing connecting at an inward end into the regulator assembly;

the air passage screw assembly further comprising a valve mechanism seated within the valve socket, the valve mechanism opening to conduct air from the internal air pathway of the screw body into the regulator assembly and closing to prevent a backflow of air from the regulator assembly into the internal air pathway of the screw body.

2. The air maintenance tire assembly of claim 1, wherein the valve housing is located within the tire cavity adjacent to the tire inner liner, and the remote end of the valve housing has external screw threads engaging into an internally threaded socket of the regulator assembly whereby connecting the regulator assembly to the screw body.

3. The air maintenance tire assembly of claim 1, wherein the air passage screw assembly further comprises a retainer ring operatively seating within the valve socket to engage the valve mechanism and retain the valve mechanism in a seated condition.

4. The air maintenance tire assembly of claim 1, wherein the air passage screw assembly further comprises a filter housing at an outward end of the screw body, the filter housing substantially enclosing an inlet filter body in a position to intercept and pass the air from outside the tire through the filter body and into the internal air pathway through the screw body.

5. The air maintenance tire assembly of claim 4, wherein the filter housing operatively seats within a sidewall pocket within the first sidewall.

6. The air maintenance tire assembly of claim 5, wherein the screw body projects through a bore within the first sidewall extending to the tire inner liner; and wherein the filter housing has a cross-sectional dimension greater than a cross-sectional dimension of a midsection of the screw body and greater than a cross-sectional dimension of the bore.

7. The air maintenance tire assembly of claim 6, wherein the filter housing and the screw body are unitarily formed.

8. An air maintenance tire assembly comprising:

a tire having a tire cavity defined by an inner liner, the inner liner bounded by first and second sidewalls extending to a tire tread region;

the first sidewall having an elongate sidewall air passageway, an air tube operatively located to compress segment-by-segment from an expanded diameter to a substantially reduced diameter responsive to a bending strain introduced into the first sidewall from a rolling tire footprint to compress air along the air passageway;

an outlet air passageway assembly connecting to the air tube operative to direct compressed air from the sidewall air passageway into the tire cavity;

a regulator assembly positioned adjacent the tire inner liner operative to control pressurized air flow into the tire cavity;

an inlet air passage screw assembly comprising an elongate substantially cylindrical screw body extending through a sidewall through-bore within the first sidewall to the tire inner liner, and the screw body having an elongate internal air pathway operative to conduct air through the screw body;

a substantially cylindrical filter housing at an outer terminal end of the screw body, the filter housing seating an inlet filter body therein, the filter body positioned to intercept and pass the air from outside the tire through the filter body and into the internal air pathway of the screw body;

wherein the filter housing resides within a pocket recessed within the first sidewall; and wherein the filter housing has a cross-sectional diametric dimension greater than a cross-sectional diametric dimension of a midsection of the screw body and greater than a cross-sectional diametric dimension of the sidewall through-bore.

9. The air maintenance tire assembly of claim 8, further comprising:

a substantially cylindrical valve housing positioned within the tire cavity against the tire inner liner, the valve housing connecting to an inward terminal end of the screw body, the valve housing having a valve socket in an air flow communication with the screw body internal air pathway, and the valve housing connecting with the regulator assembly;

the air passage screw assembly further comprising a valve mechanism seated within the valve socket, the valve mechanism opening to conduct air from the internal air pathway of the screw body into the regulator assembly and closing to prevent a backflow of air from the regulator assembly into the internal air pathway of the screw body.

10. The air maintenance tire assembly of claim 9, wherein the inward terminal end of the valve housing comprises external screw threads engaging to an internally threaded socket of the regulator assembly.

11. The air maintenance tire assembly of claim 10, wherein the air passage screw assembly further comprises a retainer ring operative to engage the valve housing from within the valve socket to retain the valve mechanism in a seated condition.

12. The air maintenance tire assembly of claim 9, wherein the valve housing has a cross-sectional diametric dimension larger than the midsection of the sidewall bore.

13. An air maintenance tire assembly comprising:

a tire having a tire cavity defined by an inner liner, the inner liner bounded by first and second sidewalls extending to a tire tread region;

the first sidewall having an elongate sidewall air passageway, the sidewall air passageway operatively located to compress segment by segment from an expanded diameter to a substantially reduced diameter responsive to a bending strain introduced into the first sidewall from a rolling tire footprint to compress air along the sidewall air passageway;

an outlet air passageway assembly connecting to the sidewall air passageway and directing compressed air from the sidewall air passageway into the tire cavity;

a regulator assembly positioned adjacent to the tire inner liner operative to control pressurized air flow into the tire cavity;

a radially extending sidewall bore formed to extend through the first sidewall, the sidewall bore having a substantially cylindrical radially outward socket and a substantially cylindrical radially inward shank portion extending from the outward bore socket to the tire inner liner, wherein the bore socket has a cross-sectional dimension greater than a diametric cross-sectional dimension of the bore shank portion;

an inlet air passage screw assembly comprising an elongate substantially cylindrical screw body extending through the shank portion of the bore, the screw body having an elongate internal air pathway operative to conduct air through the screw body;

a substantially cylindrical filter housing connected to a radially outward terminal end of the screw body, the filter housing seating within the bore socket in a position operative to intercept and pass the air from outside the tire through the filter body and into the internal air pathway of the screw body;

wherein the filter housing has a cross-sectional diametric dimension greater than a cross-sectional diametric dimension of the screw body and greater than a cross-sectional diametric dimension of the bore shank portion.

14. The air maintenance tire assembly of claim 13, further comprising:

a substantially cylindrical valve housing positioned within the tire cavity against the tire inner liner, the valve housing connected to an inward terminal end of the screw body and the valve housing having a valve socket in an air flow communication with the screw body internal air pathway, and the valve housing engaging and connecting with the regulator assembly the air passage screw assembly further comprising a valve mechanism seated within the valve socket, the valve mechanism opening to conduct air from the air pathway of the screw body into the regulator assembly and closing to prevent a backflow of air from the regulator assembly into the internal air pathway of the screw body.

15. The air maintenance tire assembly of claim 14, wherein the inward end of the valve housing connects by an external screw threaded engagement into an internally threaded socket of the regulator assembly.

16. The air maintenance tire assembly of claim 15, wherein the air passage screw assembly further comprises a retainer ring operative to engage the valve housing from within the valve socket to retain the valve mechanism in a seated condition.

17. The air maintenance tire assembly of claim 14, wherein the valve housing has a cross-sectional diametric dimension larger than the cross-sectional dimension of the bore shank portion.

* * * * *